A. H. KRUESI.
TURBINE DRIVING AUXILIARY APPARATUS.
APPLICATION FILED NOV. 14, 1906. RENEWED JUNE 27, 1908.

945,962.

Patented Jan. 11, 1910.
2 SHEETS—SHEET 2.

Witnesses:
Marcus L. Byng.
J. Ellis Ellis.

Inventor:
August H. Kruesi,
by Albert G. Davis
Att'y

UNITED STATES PATENT OFFICE.

AUGUST H. KRUESI, OF SCHENECTADY, NEW YORK, ASSIGNOR TO GENERAL ELECTRIC COMPANY, A CORPORATION OF NEW YORK.

TURBINE DRIVING AUXILIARY APPARATUS.

945,962. Specification of Letters Patent. Patented Jan. 11, 1910.

Application filed November 14, 1906, Serial No. 343,370. Renewed June 27, 1908. Serial No. 440,757.

*To all whom it may concern:*

Be it known that I, AUGUST H. KRUESI, a citizen of the United States, residing at Schenectady, county of Schenectady, State of New York, have invented certain new and useful Improvements in Supplying Steam to Turbines Driving Auxiliary Apparatus, of which the following is a specification.

This invention relates to steam turbines, and its object is to provide a system of steam supply for turbine-driven apparatus auxiliary to one or more main turbines.

In connection with a condensing turbine there are usually among other auxiliaries, a pump for circulating the cooling water, a dry-air pump and a hot-well pump, and it is desirable, for the sake of compactness and simplicity, that these be turbine-driven. It is also desirable that some or all of them be varied in speed to a greater or less degree as a function of the load on the one or more main turbines which they serve. They should all run at a certain minimum speed, corresponding say to one half load on the main turbine, and from this point up should gradually increase in speed.

The present invention consists in a system of connections between the main turbine or turbines and the secondary or auxiliary turbines whereby the latter will operate in the desired manner, as above set forth. The steam for the secondary or auxiliaries is taken from a lower stage of the main turbine or turbines, or from the passage-ways leading from some of the nozzle valves to their respective nozzles. In the former case the steam has had a fraction of its energy extracted by the wheels in the preceding stage or stages, and consequently is below the ordinary working steam pressure. Under such conditions I convey the steam to some stage in the auxiliary beyond the initial, as the second for example. In the second case, the steam passing the nozzle valve is divided between the main turbine or the auxiliary. In both cases the speed of the auxiliary turbines will depend upon the amount of steam supplied thereto, and means are provided for taking a variable amount of steam from the main turbine or turbines so as to secure a variable speed of the auxiliary turbine. In other words, the opening of more nozzle valves, in response to an increased load on the main turbine or turbines, causes an increase in the amount of steam going to the auxiliaries and therefore an increase in their speed; which is the thing desired.

Figure 1:
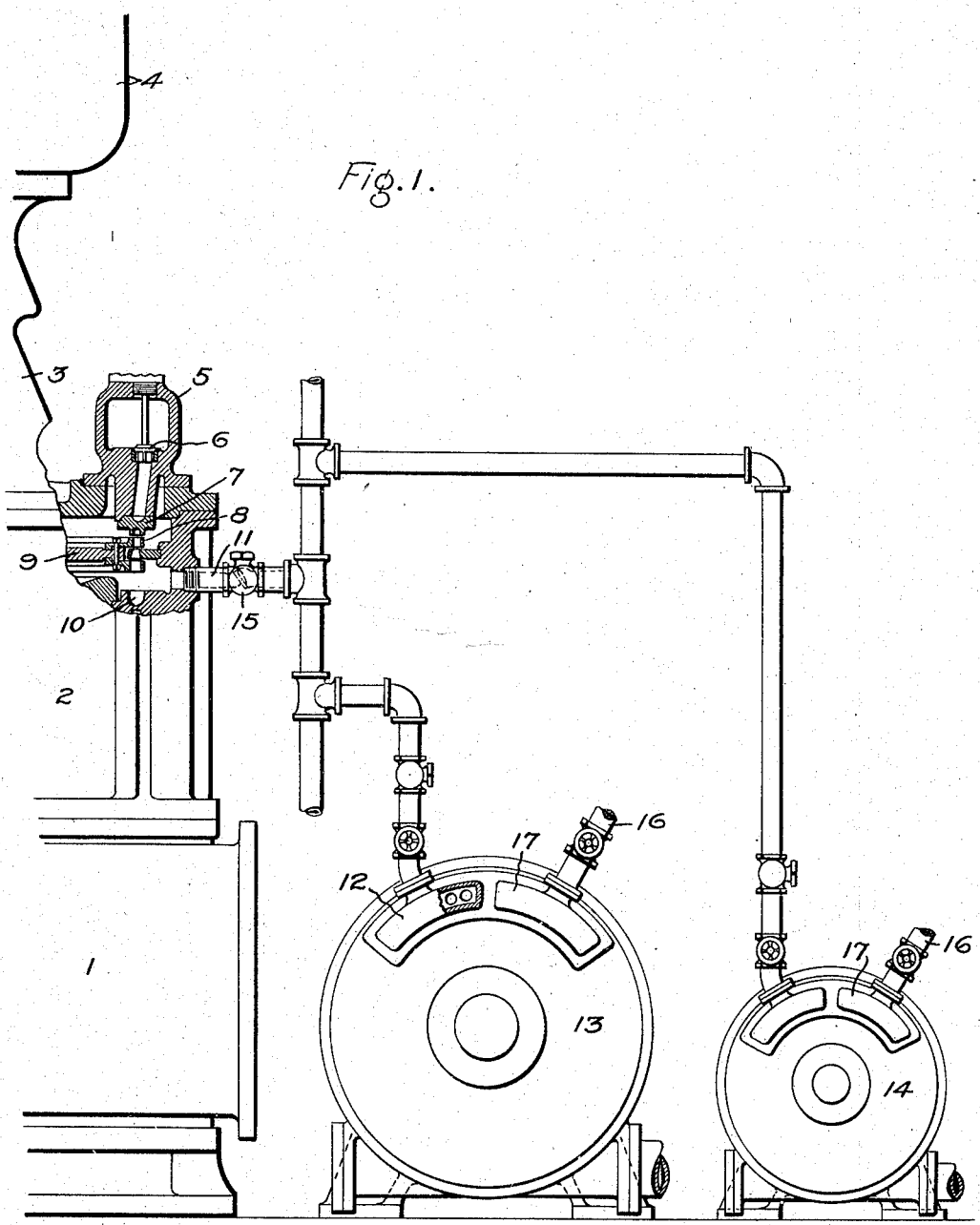
Figure 2:
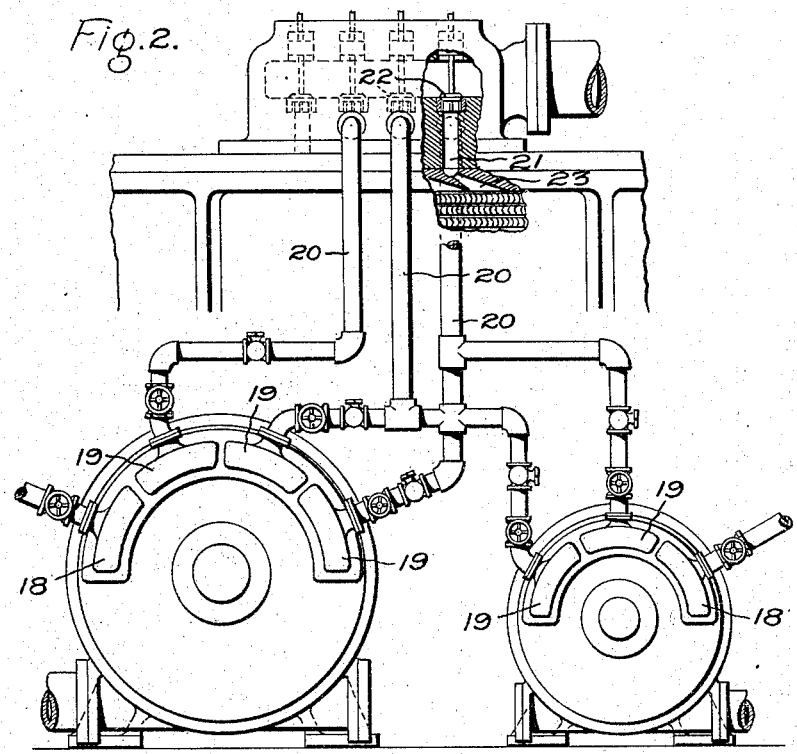

In the accompanying drawings, illustrating embodiments of my invention, Figure 1 is an outline elevation, partly in section, of a main turbine, and two auxiliary turbines connected with the second stage of said main turbine and driving pumps or other apparatus; Fig. 2 shows two auxiliary turbines each having two or more sets of nozzles, one set being connected to some constant source of steam supply and each of the remaining sets being connected with a given passageway between the nozzle valve and the nozzles of the main turbine; and Fig. 3 shows how the auxiliaries of two or more turbines can be connected.

Referring first to Fig. 1, the main turbine is partially shown at the left, comprising a chambered base 1, the turbine wheel casing 2, stool 3 and generator 4. The steam chest 5 contains the nozzle valves, one of which is shown controlling the passage-way to a nozzle 7, from which the steam impinges against the buckets 8 of the first stage wheel 9. After passing this wheel the steam enters the nozzles 10 of the second stage. This turbine may be operated at any predetermined speed as is well understood. Just above these nozzles a pipe 11 is tapped through the wall of the casing 2 and connects with the nozzles 12 of two or more auxiliary turbines, one of which, 13, may drive the circulating pump for the condenser, while the other, 14, may, for instance, drive the air-pump. The auxiliary or secondary turbines at full load may operate at any predetermined speed, which speed may, with advantage, be greater than that of the main turbine or turbines, especially when the latter are of large capacity. A check valve 15 in the pipe 11 prevents any backward flow of steam from the auxiliaries, so that in case it is desired to operate the auxiliaries when the main turbine is not running, live steam can be supplied to them through the pipes 16 and nozzles 17. The valve casing on the auxiliary turbines connected to the main steam supply is intended to provide a sufficient and constant amount of steam—subject to control by throttle valve or automatic governor—to keep the auxiliary turbine and the apparatus driven thereby running at a certain minimum speed regardless of the load on the main turbine. In general, the steam carrying capacity of the nozzles supplied from the independent source, and under the control of the governor, should be equal to or slightly greater than the combined steam carrying capacity of the nozzles supplied from the main turbine. The governor of the auxiliary turbines should be so set as to admit steam to all of the nozzles under its control at the same time that the other nozzles are carrying their full steam capacity, and the turbine is doing the maximum amount of work. Under the conditions specified the governor will only come into action to reduce the steam flowing into the independently supplied nozzle when the load on the auxiliary turbine drops below approximately one-half.

In Fig. 2, the auxiliaries have a plurality of sets of nozzles, one of which 18 is supplied with steam independently, and the others 19 are connected respectively with pipes 20 leading from the ports or passage-ways 21 between the nozzle valves 22 and the nozzles 23 of the main turbine. As these valves open and close in response to the varied demands upon the main turbine, the amount of steam furnished to the auxiliaries will vary in a corresponding degree.

Figure 3:
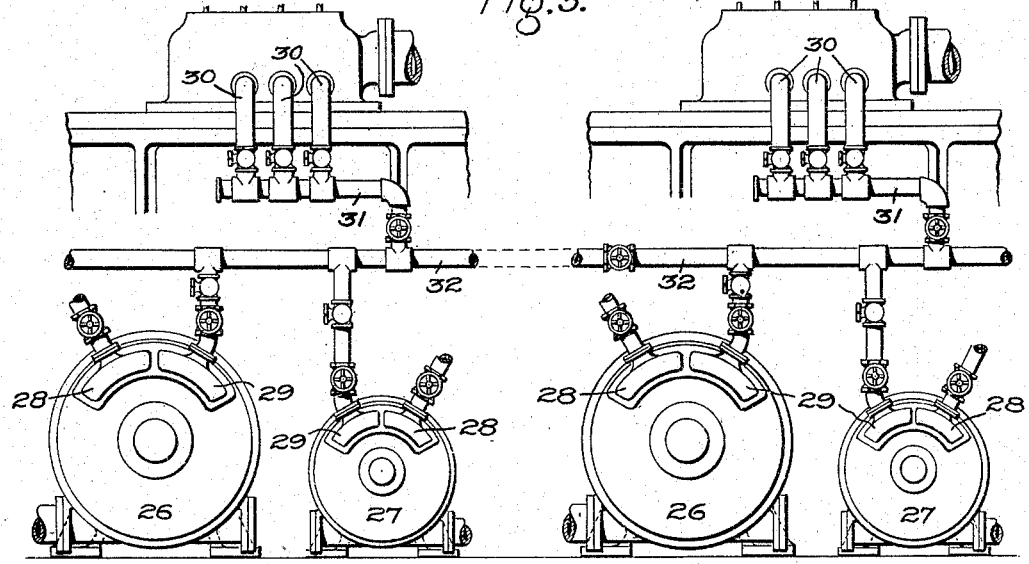

In Fig. 3, each of the auxiliaries 26, 27, has two sets of nozzles 28, 29, one for independent steam supply and the other for the steam from the main turbine. The pipes 30 from the several passage-ways below the main nozzle valves all connect with a single pipe 31 having branches leading to the auxiliary nozzles 29. Moreover, the several auxiliaries of two or more main turbines are all connected by a main 32, for convenience in driving when any main turbine is shut down for a longer or shorter time. The particular application for this is where one set of auxiliary apparatus serves two or more main turbines.

Between the main and auxiliary turbines are check or non-return valves to prevent the return flow of steam, to prevent leakage of air into the turbine when it is carrying light load, to prevent steam from one auxiliary turbine passing over to some other auxiliary turbine, and to prevent steam from one controlling valve on a main turbine passing to the nozzles controlled by another valve, and so on.

I have described my invention in connection with turbines of the jet or impulse type but it is to be understood that it can be used in connection with other types of turbines with such modifications of the piping and other parts as would naturally suggest themselves.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is,—

1. The combination with one or more main turbines, of turbines for driving auxiliaries which act on the exhaust from the main turbine or turbines, and means for varying the steam supplied to said auxiliary turbines and also their speed in any desired relation to the load changes on the main turbine or turbines.

2. The combination with one or more main turbines, of turbines for driving auxiliaries, and means for driving said auxiliary turbines at a minimum speed corresponding to a fraction of the full load on the main turbine or turbines, and automatically increasing the speed of said auxiliary turbines with the increase in the load on the main turbine or turbines.

3. The combination with one or more main turbines, having a plurality of nozzle valves and passage-ways, of turbines for driving the auxiliaries, and connections between said latter turbines and one or more of the nozzle passage-ways of said main turbine or turbines.

4. The combination with one or more main turbines, having a plurality of nozzle valves and passage-ways, of pipes leading from two or more of said passage-ways, and turbines for driving the auxiliaries, each provided with one or more nozzles connected with said pipes.

5. The combination with one or more main turbines, having a plurality of nozzle valves and passage-ways, of pipes leading from one or more of said passage-ways, a main into which said pipes feed, turbines for driving the auxiliaries, and connection between said main and said auxiliary turbines.

6. The combination with one or more main turbines, of turbines for driving the auxiliaries, means for supplying said auxiliary turbines with steam in accordance with the load on the main turbine or turbines, and separate means for driving said auxiliary turbines by steam from an independent source or sources.

7. The combination with one or more main turbines having a plurality of admission ports, of one or more auxiliary turbines, one or more conduits for supplying steam to the auxiliary turbines from a given source, conduits conveying steam from the main turbine to auxiliaries, and non-return valves in the conduits.

8. In combination, one or more main turbines, a valve chest supplying steam thereto, one or more auxiliary turbines receiving a part of their steam from a source of high pressure and the remainder from the main turbine or turbines after it passes through the valve chest.

9. In combination, a main turbine, an auxiliary turbine, independent ports supplying elastic fluid to the main turbine, other independent ports supplying fluid to the auxiliary turbine, conduits connecting one or more of the first mentioned ports with a corresponding number of the second mentioned ports, non-return valves between the turbines, and mains for supplying high pressure fluid to the turbines.

10. In combination, one or more main turbines, a turbine for driving an auxiliary which acts on the exhaust from the main turbine and receives its motive fluid from said turbine, and means for increasing the supply of motive fluid to the auxiliary turbine and also its speed as the exhaust from the main turbine increases and decreasing the supply of said fluid and the speed of the auxiliary as the exhaust from the main turbine decreases.

11. A main turbine in combination with an auxiliary turbine which is subjected to a smaller pressure difference than the first, the auxiliary turbine being operated by a portion of the same motive fluid which passes through and operates the first.

12. In combination, a turbine wherein a given drop in pressure of the motive fluid takes place, a second turbine wherein a drop in pressure takes place that is less than in the first turbine, the second turbine being in shunt to the first and operated by a relatively small portion of the same motive fluid which passes through and operates the first.

13. In combination, a main turbine which operates at a given speed, a small auxiliary turbine which operates at a different speed, and means causing a portion of the same motive fluid which passes through and operates the main turbine to pass through and operate the auxiliary turbine.

14. In combination, a turbine having an inlet and an exhaust, a second turbine also having an inlet and an exhaust, and means causing a portion only of the motive fluid which passes through and operates the first turbine to pass through the second and operate it, the pressure difference between the inlet and exhaust of the second turbine being less than that of the first.

15. In combination, a main turbine which operates at a given speed and is provided with an inlet and an exhaust, a secondary turbine which operates at a different speed and drives an auxiliary that acts on the exhaust of the main turbine and is provided with an inlet and an exhaust, the secondary turbine operating on a smaller difference in pressure between the inlet and the exhaust than the main turbine, and means causing the same motive fluid which passes through one turbine to perform useful work in the other turbine.

16. In combination, a multi-stage turbine, an auxiliary turbine, both turbines having substantially the same exhaust pressure, means for supplying both turbines with motive fluid, and means for connecting the auxiliary turbine in shunt to a portion of the multi-stage turbine so that the latter will operate between a smaller pressure difference than the former.

17. In combination, a main turbine which operates at a predetermined speed, auxiliary turbines which operate at speeds differing from that of the main turbine, and means for causing a portion of the same motive fluid which passes through and operates the main turbine to pass through and operate the auxiliary turbines.

18. In combination, a main turbine which operates at a predetermined speed, an auxiliary turbine which operates at a different speed, means causing a part of the same motive fluid which passes through one turbine to enter the other turbine and perform useful work therein, and controlling means for regulating the passage of motive fluid through the auxiliary turbine.

19. The combination with one or more main turbines, of a secondary turbine for driving an auxiliary, means conveying motive fluid from the main turbine to the secondary turbine, and separate means for supplying the secondary turbine with motive fluid from a different source.

20. The combination with a main turbine, of a secondary turbine for driving an auxiliary, means conveying motive fluid from the main to the secondary turbine, and a non-return valve which prevents the passage of motive fluid or air from the secondary to the main turbine.

21. The combination with a main turbine, a secondary turbine, means for conveying motive fluid from one turbine to the other, a conduit for admitting motive fluid to one of the turbines, and a valve which prevents fluid from flowing through said means in the reversed direction.

In witness whereof, I have hereunto set my hand this 13th day of November, 1906.

AUGUST H. KRUESI.

Witnesses:
BENJAMIN B. HULL,
HELEN ORFORD.